US010708355B2

(12) United States Patent
Yamakawa

(10) Patent No.: US 10,708,355 B2
(45) Date of Patent: Jul. 7, 2020

(54) STORAGE NODE, STORAGE NODE ADMINISTRATION DEVICE, STORAGE NODE LOGICAL CAPACITY SETTING METHOD, PROGRAM, RECORDING MEDIUM, AND DISTRIBUTED DATA STORAGE SYSTEM

(71) Applicant: NEC CORPORATION, Tokyo (JP)

(72) Inventor: Satoshi Yamakawa, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 675 days.

(21) Appl. No.: 14/781,088

(22) PCT Filed: May 15, 2014

(86) PCT No.: PCT/JP2014/002562
§ 371 (c)(1),
(2) Date: Sep. 29, 2015

(87) PCT Pub. No.: WO2014/188682
PCT Pub. Date: Nov. 27, 2014

(65) Prior Publication Data
US 2016/0308965 A1 Oct. 20, 2016

(30) Foreign Application Priority Data
May 20, 2013 (JP) ................... 2013-106077

(51) Int. Cl.
H04L 29/08 (2006.01)
G06F 3/06 (2006.01)
H04L 12/24 (2006.01)

(52) U.S. Cl.
CPC .......... H04L 67/1097 (2013.01); G06F 3/061 (2013.01); G06F 3/067 (2013.01);
(Continued)

(58) Field of Classification Search
CPC ............ H04L 67/1097; H04L 41/0813; H04L 41/0823; G06F 3/061; G06F 6/0644; G06F 3/067
See application file for complete search history.

(56) References Cited

U.S. PATENT DOCUMENTS 8,082,330 B1 * 12/2011 Castelli ................. G06F 9/5016
709/220
8,190,588 B1 * 5/2012 Gupta .................. G06F 11/1662
707/703

(Continued)

FOREIGN PATENT DOCUMENTS

EP     2 608 043 A1   6/2013
JP     2004-252663 A  9/2004

(Continued)

OTHER PUBLICATIONS

International Search Report for PCT/JP2014/002562 dated Jun. 10, 2014 [PCT/ISA/210].

Primary Examiner — Thomas J Dailey
Assistant Examiner — Angela M Widhalm De Rodrig
(74) Attorney, Agent, or Firm — Sughrue Mion, PLLC

(57) ABSTRACT

A storage node administration device enables setting a logical capacity of a storage region based on an I/O performance value of a storage node. In a distributed data storage system, the storage node administration device includes a setting unit setting at least one reference node from a plurality of storage nodes having different I/O performances, dividing a storage region of the storage nodes other than the reference node into a first storage region and a second storage region, referring to the I/O performance and the logical capacity of the reference node, and setting the logical capacity of each region to match the I/O performance of the storage nodes other than the reference node; a determination unit determining system configuration information which (Continued)

reflects a configuration change of the distributed data storage system; and a transmission unit transmitting the system configuration information to the storage nodes having different I/O performances.

6 Claims, 8 Drawing Sheets

(52) U.S. Cl.
CPC ........ G06F 3/0644 (2013.01); H04L 41/0813 (2013.01); H04L 41/0823 (2013.01)

(56) References Cited

U.S. PATENT DOCUMENTS

| | | | | |
|---|---|---|---|---|
| 8,214,404 B2* | 7/2012 | Kazar | ............. | G06F 3/0605 707/797 |
| 8,543,778 B2* | 9/2013 | Emaru | ............. | G06F 3/0608 711/114 |
| 8,566,543 B2* | 10/2013 | Kabano | ............. | G06F 17/30138 711/162 |
| 8,949,483 B1* | 2/2015 | Martin | ............. | G06F 3/0653 710/15 |
| 10,552,342 B1* | 2/2020 | Marshak | ............. | G06F 3/061 |
| 2004/0078633 A1* | 4/2004 | Holland | ............. | G06F 11/1464 714/5.11 |
| 2004/0162953 A1* | 8/2004 | Yoshida | ............. | G06F 3/0613 711/153 |
| 2006/0236056 A1* | 10/2006 | Nagata | ............. | G06F 3/061 711/165 |
| 2008/0126842 A1* | 5/2008 | Jacobson | ............. | G06F 11/1662 714/6.12 |
| 2009/0271485 A1* | 10/2009 | Sawyer | ............. | G06F 3/061 709/206 |
| 2009/0320041 A1* | 12/2009 | Noguchi | ............. | G06F 3/061 718/105 |
| 2010/0042793 A1* | 2/2010 | Awakura | ............. | G06F 3/0619 711/162 |
| 2010/0082765 A1* | 4/2010 | Murase | ............. | G06F 3/0608 709/213 |
| 2010/0228931 A1 | 9/2010 | Mikami | | |
| 2010/0281214 A1* | 11/2010 | Jernigan, IV | ............. | G06F 3/0608 711/114 |
| 2011/0010518 A1* | 1/2011 | Kavuri | ............. | G06F 3/0647 711/165 |
| 2011/0060878 A1* | 3/2011 | Kaneko | ............. | G06F 3/061 711/114 |
| 2012/0317355 A1* | 12/2012 | Ishizaki | ............. | G06F 3/0607 711/114 |
| 2012/0324202 A1* | 12/2012 | Ozaki | ............. | G06F 3/0611 711/173 |
| 2013/0086270 A1* | 4/2013 | Nishikawa | ............. | G06F 9/5011 709/226 |
| 2013/0117264 A1 | 5/2013 | Ishikawa | | |

FOREIGN PATENT DOCUMENTS

| | | |
|---|---|---|
| JP | 2009-151519 A | 7/2009 |
| JP | 2010-152715 A | 7/2010 |
| JP | 2010-211421 A | 9/2010 |
| JP | 2012-525634 A | 10/2012 |
| JP | 2013-45379 A | 3/2013 |
| WO | 2010/126596 A1 | 11/2010 |
| WO | 2012/023384 A1 | 2/2012 |

* cited by examiner

STORAGE NODE, STORAGE NODE ADMINISTRATION DEVICE, STORAGE NODE LOGICAL CAPACITY SETTING METHOD, PROGRAM, RECORDING MEDIUM, AND DISTRIBUTED DATA STORAGE SYSTEM

CROSS REFERENCE TO RELATED APPLICATIONS

This application is a National Stage of International Application No. PCT/JP2014/002562 filed May 15, 2014, claiming priority based on Japanese Patent Application No. 2013-106077, filed May 20, 2013, the contents of all of which are incorporated herein by reference in their entirety.

TECHNICAL FIELD

The present invention relates to a technical field in which the storage logical capacities of storage nodes are set.

BACKGROUND ART

In recent years, a demand for large-scale data processing is increasing, as the high-speed network and the Internet spread. As the demand increases, there is a need for an increase in capacity (hereinafter, called as "storage capacity") capable of being stored in a storage node for use in data processing.

However, when storage nodes are constituted using a single server, the following problems may occur. Firstly, there is a limit in expanding storage nodes. Secondly, it is difficult to increase the storage capacity and to improve the I/O (input/output) performance when the server is in operation. Thirdly, a storage node may become a single failure point. In order to solve these problems, a technique called a distributed data system is proposed.

Generally, a distributed data system uses a plurality of external storage devices of server devices as a distributed data storage node connected via a network. The distributed data storage node is operates by linking a plurality of node groups incorporated with storage devices. Therefore, the distributed data storage node is a computer system capable of acting like one node.

The distributed data storage system has a feature scale out expandability such as increasing the data storage capacity or improving the data accessibility by adding a node (i.e. a server device) constituting the system.

The distributed data storage system stores data with writing request not in a single node but in a plurality of nodes by duplicating the data. Therefore, even in a case where a certain node becomes inaccessible due to failure of the node and the node fails to function as a storage node, the distributed data storage system can continue the following process. That is, at a reply process to accessing to data stored in a failed node, another node storing a duplicate of the data stored in the failed node inherits the service that has been carried out by the failed node. With the process above, the distributed data storage system can maintain availability of the system.

Further, even in a case where the data stored in a certain node cannot be reread due to node failure, the distributed data storage system can use the duplicated data stored in another node. According to this, loss of data can be prevented, and at the same time, reliability of data holding can be maintained.

Thus, introduction of a distributed data storage system has progressed in a variety of systems in view of trends such as free expandability of system scale, improved performance in processing nodes constituting a system, an increase in the capacity of a storage device, and achieving a low cost.

In a distributed data storage system, a certain number of hardware nodes are required, considering the service scale in an IT (Information Technology) system, in order to maintain availability of services to be provided and reliability of data holding.

An HDD (Hard Disk Drive) is mainly employed as an actual storage device for physically storing data. Capacity of an HDD is continued to increase for many years. However, further improvement of I/O performance of an HDD stagnates, and the I/O performance per capacity has been decreasing year by year.

Meanwhile, capacity of an SSD (Solid-State Drive) incorporated with a flash memory as a storage medium has been increasing year by year, as well as an HDD. In recent years, a demand for an SSD is increasing since an SSD has random accessibility exceedingly superior to an HDD.

Further, increasing capacity of volatile memories as represented by a DRAM (Dynamic Random Access Memory), and development of storage devices incorporated with a next-generation non-volatile semiconductor memory having an I/O performance exceedingly superior to that of a flash memory has also progressed. A plurality of storage devices having different costs, performance characteristics, and capacities are employed as a storage device group within a single storage system.

As described above, regarding the nodes constituting a distributed data storage, it is possible to combine devices having remarkable different I/O performances from each other, in addition to combining devices having a difference in data storage capacity.

Further, when a distributed data storage system is operated, scale out expandability such that a system is stored by adding a new node can be maintained.

However, in order to achieve the aforementioned scale-out expandability, it is necessary to equally distribute data among the nodes, and to uniquely set data storage destinations in a facilitated manner, even when a number of nodes constituting the distributed data storage system increases.

In order to achieve the aforementioned features, there is proposed a method to share rules for arithmetically setting data storage destinations between each node and a client which accesses to data, without administrating IDs (identifiers) for specifying data and data storage destinations using a data table in a certain node.

Employing the aforementioned method allows for the client to uniquely set a data storage destination, each time the client accesses to data, without querying other nodes for the data storage destination.

Further, when the number of nodes constituting a distributed data storage system increases to several hundreds or thousands, a following problems may occur. Specifically, when a specific one of the nodes administers all the data storage destinations or replies to queries from the clients for data storage destinations, the node may be a performance bottleneck in the system.

By employing the aforementioned arithmetical data storage destination setting method, the performance bottleneck as described above may be avoided. As an algorithm for arithmetically setting data storage destinations, there are proposed an algorithm in which hash functions called Consistent Hashing are combined, and an algorithm in which random functions are combined.

These algorithms equally assign data storage. By using the algorithms, in a distributed data storage system configured such that a plurality of node groups having the same performance are linked to each other, it is possible to avoid the problems such that a deviation occurs in a specific one of the nodes and the data storage capacity exceeds in the specific one of the nodes as a result, and that access deviation occurs in a specific one of the nodes and the performance is degraded.

The arithmetical data storage destination setting method has following features. That is, data identifiers (IDs) assigned to respective data in advance, and data itself are set as input data. In this case, system configuration information including "the number of nodes constituting a system", "a logical data capacity assigned to each node", "IP address (Internet Protocol Address) information of nodes", "activation/non-activation of nodes", and "storage information in which calculation result values by a predetermined arithmetic expression, and data storage destinations are associated with each other" is set as parameters for use in calculation. In this method, a node serving as a data storage destination is set by the value calculated using the parameters.

Thus, According to the aforementioned setting method, when the system configuration is changed due to node addition or node failure, it is possible to share only the system configuration information between a node constituting the system, and a client which accesses to data. Therefore, it is possible to uniquely set in which node, all the data is to be stored.

As described above, when all the nodes constituting a distributed data storage system have the same capacity and the same I/O performance, the system configuration information may be set in such a manner that data is equally distributed and stored in all the nodes, using the arithmetical data storage destination setting method.

In the distributed data storage system as set above, it is possible to equally distribute the consumption amount of the storage capacity of each node, and the number of data access I/O, as data is newly generated or written.

However, when the aforementioned distributed data storage system is operated for a long term, it is necessary to solve a problem such that a storage node having the same performance as an existing storage node cannot be procured. In this case, it is considered that a storage node having a different capacity and a different I/O performance from those of the storage nodes incorporated in the system is incorporated as a newly-introduced storage node.

Further, it is also considered to constitute a system of storage nodes having different performances from the beginning.

For instance, PTL1 proposes a multi-node storage system. The multi-node storage system is configured such that an administration node, and storage nodes of different types which administer storage devices of different types are connected to each other via a network. Further, the administration node acquires information relating to data administration from the storage nodes of different types, and updates the logical volume as necessary.

The system described in PTL2 judges in which one of the storage nodes, data is to be stored, on the basis of a hash value to be calculated from a key given to the data. It is possible to calculate a hash value with respect to a key, for instance, using MD5 (Message Digest algorithm 5). The system may use another hash function such as an SHA (Secure Hash Algorithm).

The method for determining a target storage node (hereinafter, also called as a target node) on the basis of a hash value with respect to a key may be called as Consistent Hashing. PTL2 proposes a distributed storage system, in which a target node as an access destination is judged on the basis of a target administration table which administers the target node with respect to a hash value.

In addition to that, the system described in PTL3 divides a storage region into a first storage region and a second storage region regarding a data distribution method. When there is no vacant region in the first storage region, data is stored in the second storage region as user information. Thus, data is distributed and stored by interchanging the user information stored in the first storage region, and the user information stored in the second storage region according to a condition i.e. on the basis of frequency of use of user information.

CITATION LIST

Patent Literature

PTL1: Japanese Laid-open Patent Publication No. 2009-151519
PTL2: Japanese Laid-open Patent Publication No. 2013-045379
PTL3: Japanese Laid-open Patent Publication No. 2010-152715

SUMMARY OF INVENTION

Technical Problem

However, when a storage node having a different capacity and a different I/O performance is set or newly introduced, it is necessary to impart a deviation to the data storage amount and to the data access I/O number stochastically in accordance with deviation of the performance. In view of the above, it is necessary to assign a weight of a multiple of the performance of the introduced node, out of the system configuration information to be used by the arithmetical data storage destination setting method so that a specific one of the nodes can handle the data storage amount and the data access I/O number in accordance with the performance of the node.

For instance, when the storage logical capacity of a newly introduced node is two times of the logical capacity of a node being operated in the system, a weight applied to the newly introduced node is set to two times of the weight applied to the other node. As a result, it is possible to store data whose capacity is two times stochastically.

However, when a node having a different performance as described above is newly introduced to the system, if the aforementioned weight is applied in accordance with the capacity of data, the data access I/O number increases by the number equal to the applied weight as compared with the other node.

For instance, when the weight of two times is set in accordance with the logical capacity, the newly introduced node needs to have an I/O performance capable of processing the I/O with two times. Otherwise, the newly introduced node becomes a performance bottleneck. As a result, there is a problem such that a performance of the entire system may be degraded.

Further, it is assumed that a newly introduced node has an I/O performance of ten times of the existing node, and the weight of ten times as large as the weight applied to the other node is applied to the newly introduced node. In this case, the storage consumption rate of the newly introduced node increases as compared with the other node, unless the storage logical capacity is ten times or more. As a result, the storage consumption rate of the entire system may be lowered.

In other words, even though there is a sufficient storage capacity in the other node, there is a problem such that it is necessary to add another introductory node to expand the storage capacity.

The distributed data storage system has a function of distributing data and data access I/O on the basis of the arithmetical data storage destination setting method. However, in the distributed data storage system, it is difficult to assign the data storage capacity and the data access I/O number that match the storage logical capacity and the I/O performance respectively if a storage node having a different performance is incorporated.

Using the techniques described in PTLs 1 to 3, it is possible to update the logical volume of a node on the basis of use of a node having a different performance and on the basis of data administration information.

Further, the storage control method described in PTL2 is capable of discriminating nodes as access destinations. Further, the access control method described in PTL3 is capable of storing data in the first storage region or in the second storage region, and capable of interchanging data in accordance with frequency of use of data.

However, the techniques described in PTLs 1 to 3 cannot set the capacity of a storage region of a node on the basis of a difference in I/O performance.

In view of the above, a principal object of the invention is to provide a storage node administration device, a storage node logical capacity setting method, a program, a recording medium, and a distributed data storage system that enable to set the logical capacity of a storage region on the basis of an I/O performance value of a storage node.

Solution to Problem

A storage node administration device according to an exemplary embodiment of the invention includes:

when a distributed data storage system is configured on the basis of a plurality of storage nodes having different I/O performances, a setting means which sets at least one reference storage node from the storage nodes having different I/O performances, divides a storage region of the storage nodes other than the reference storage node into a first storage region and a second storage region, referring to the I/O performance and a logical capacity of the reference storage node, and sets a logical capacity of the first storage region and a logical capacity of the second storage region to match the I/O performance of the storage nodes other than the reference storage node;

a determination means which determines system configuration information which reflects a configuration change of the distributed data storage system on the basis of information set by the setting means; and a transmission means which transmits the system configuration information determined by the determination means to the storage nodes having different I/O performances.

A storage node logical capacity setting method according to an exemplary embodiment of the invention includes, when a distributed data storage system is configured on the basis of a plurality of storage nodes having different I/O performances, setting at least one reference storage node from the storage nodes having different I/O performances; and dividing a storage region of the storage nodes other than the reference storage node into a first storage region and a second storage region, referring to the I/O performance and a logical capacity of the reference storage node, and setting a logical capacity of the first storage region and a logical capacity of the second storage region to match the I/O performance of the storage nodes other than the reference storage node.

A program according to an exemplary embodiment of the invention causes a computer to execute, when a distributed data storage system is configured on the basis of a plurality of storage nodes having different I/O performances, a process of setting at least one reference storage node from the storage nodes having different I/O performances; and a process of dividing a storage region of the storage nodes other than the reference storage node into a first storage region and a second storage region, referring to the I/O performance and a logical capacity of the reference storage node, and setting a logical capacity of the first storage region and a logical capacity of the second storage region to match the I/O performance of the storage nodes other than the reference storage node.

A recording medium according to an exemplary embodiment of the invention is recorded with a program that causes a computer to execute, when a distributed data storage system is configured on the basis of a plurality of storage nodes having different I/O performances, a process of setting at least one reference storage node from the storage nodes having different I/O performances; and a process of dividing a storage region of the storage nodes other than the reference storage node into a first storage region and a second storage region, referring to the I/O performance and a logical capacity of the reference storage node, and setting a logical capacity of the first storage region and a logical capacity of the second storage region to match the I/O performance of the storage nodes other than the reference storage node.

A storage node according to an exemplary embodiment of the invention includes:

a storage means including a storage device which is divided into first storage region and a second storage region by the aforementioned storage administration device;

a data input/output administration means which determines, in response to an access request to data to be stored in the storage means, whether the access request is an access request to the storage node;

a data storage administration means which administers a data administration table in which three items of information, an ID of data to be written, a physical address as a data storage destination, and access frequency information, are associated with each other, and which reads and writes data in accordance with the ID of data designated by the data input/output administration means, and in accordance with a data read/write command; and a storage used amount administration means which classifies addresses of the storage device in such a manner that a capacity of the first storage region and a capacity of the second storage region are filled on the basis of a logical capacity included in the system configuration information to be acquired from the aforementioned storage administration device.

A distributed data storage system according to an exemplary embodiment of the invention is provided with the aforementioned storage administration device and the aforementioned storage node.

Advantageous Effects of Invention

According to the invention, it is possible to provide a storage node administration device, a storage node logical capacity setting method, a program, a recording medium, and a distributed data storage system that enable to set the logical capacity of a storage region on the basis of an I/O performance value of a storage node.

DESCRIPTION OF EMBODIMENTS

Figure 1:
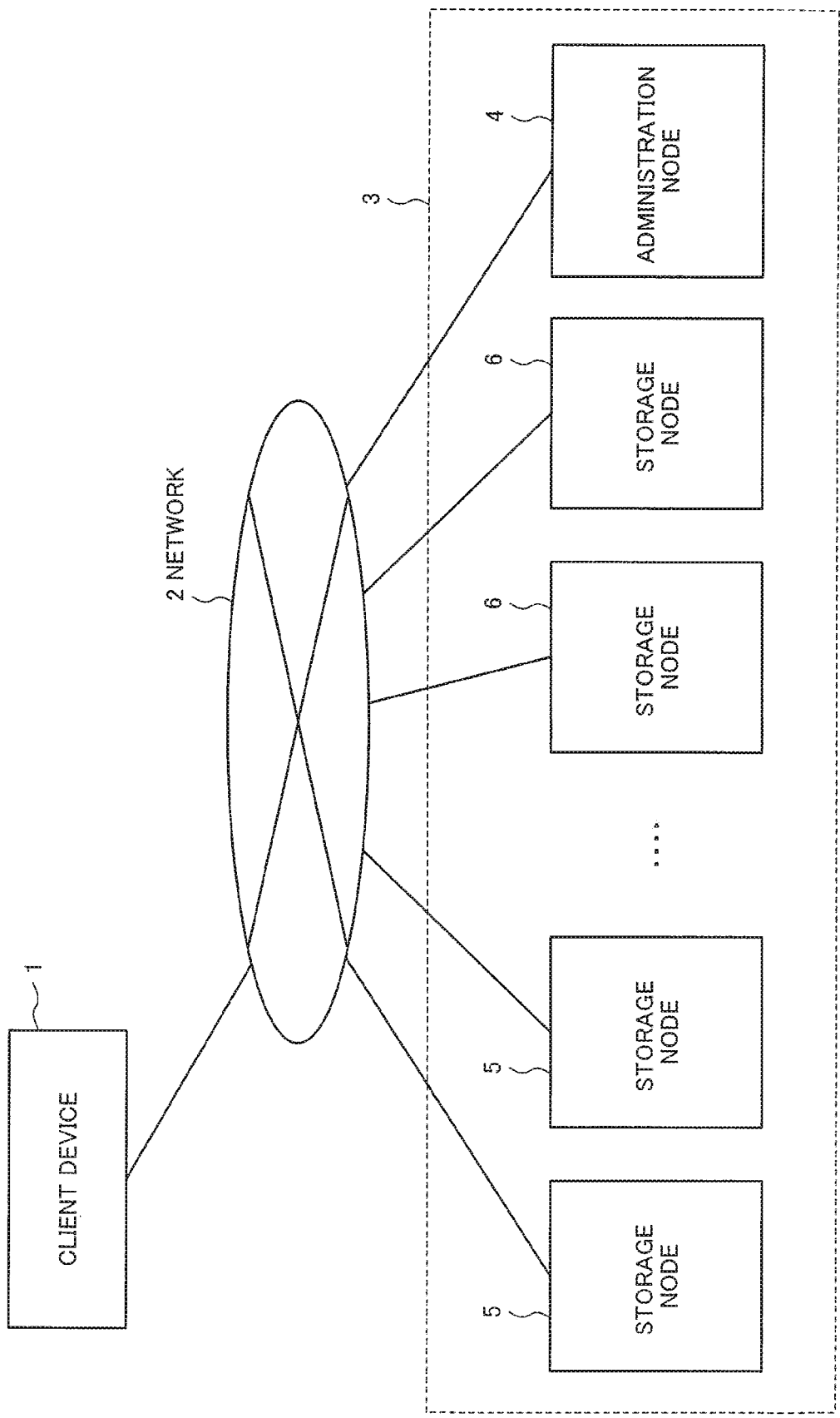
FIG. 1 is a block diagram illustrating a configuration of a distributed data storage system in a first exemplary embodiment of the invention.

In the following, exemplary embodiments of the invention are described in detail referring to the drawings.

First Embodiment

FIG. 1 is a block diagram illustrating a configuration of a distributed data storage system in the first exemplary embodiment of the invention. As illustrated in FIG. 1, a distributed data storage system 3 is configured such that one administration node 4, and two or more storage nodes 5 at least having the same performance are communicatively connected to each other via a network.

Further, one or more client devices 1 are communicatively connected to the storage nodes 5, and to a plurality of storage nodes 6 which will be added later via the network 2.

The client device 1 is a computer which is operated by a user. In response to a new writing request, the user operates the client device 1, and transmits a data access request indicating a request to access to the storage node 5 in the distributed data storage system 3.

In response to the access, the client device 1 uses a predetermined arithmetic expression in order to calculate a data storage destination. That is, the client device 1 gives an ID to data subject to be written, and calculates a value representing a data storage destination using the ID as input data for the arithmetic expression.

Subsequently, the client device 1 sets the data storage destination by performing a matching operation between the calculated value and storage information included in system configuration information acquired from the administration node 4. Moreover, the client device 1 reads and writes data by transmitting the ID and the data subject to be written together with a writing command to the storage node 5 as the data storage destination.

The administration node 4 is a terminal device which an administrator of the distributed data storage system 3 operates. The administrator of the distributed data storage system 3 is allowed to access to the storage nodes 5 and 6 by operating the administration node 4, and set system configuration information for various settings necessary for operating the system.

Figure 2:
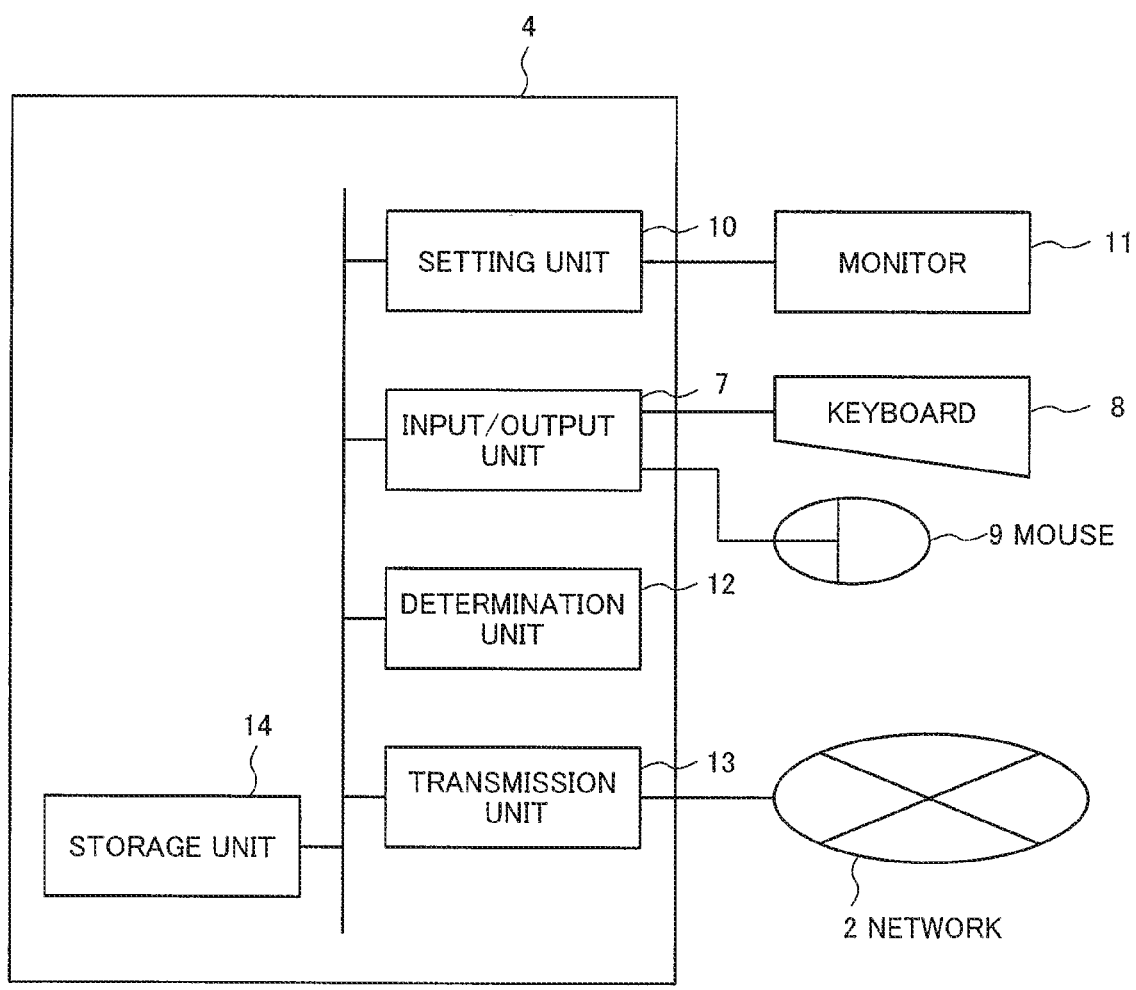
FIG. 2 is a block diagram illustrating a configuration of an administration node in the first exemplary embodiment of the invention.

FIG. 2 is a block diagram illustrating a configuration of the administration node in the first exemplary embodiment of the present invention. As illustrated in FIG. 2, the administration node 4 is configured such that an input/output unit 7, a setting unit 10, a determination unit 12, a transmission unit 13, and a storage unit 14 are connected to.

The input/output unit 7 is connected to a keyboard 8 and to a mouse 9. The input/output unit 7 transfers a signal transmitted from the keyboard 8 or from the mouse 9 to the respective units via a bus.

The setting unit 10 is connected to a monitor 11. When the system configuration is changed due to setting, addition, or failure of a storage node having a different I/O performance in the distributed data storage system 3, the setting unit 10 displays the system configuration information on a screen of a monitor.

The system configuration information is constituted of "logical data capacity", "IP address information of storage nodes", "activation/non-activation of storage nodes", and "storage information in which calculation result values and data storage destinations are associated with each other on the basis of calculation results by a predetermined arithmetic expression".

The setting unit 10 sets latest system configuration information which reflects a system configuration change based on setting, addition, or failure of a storage node. The setting unit 10 divides the storage region of the set or added storage node into a first storage region and a second storage region, and sets the logical capacity of each region.

The determination unit 12 determines system configuration information which reflects a configuration change of the distributed data storage system on the basis of the information set by the setting unit 10.

The transmission unit 13 transmits, to the client device 1 and/or to each storage node, the information set by the setting unit 10 and the system configuration information determined by the determination unit 12 via the network 2.

The storage unit 14 stores the information set by the setting unit 10 and the system configuration information determined by the determination unit 12.

Among the system configuration information, an example of "calculation results to be obtained by an arithmetic expression, and storage information" is described in the following. Note that the assignment method differs depending on the arithmetic expression to be used.

For instance, Consistent Hashing is used as an arithmetic expression for determining a data storage destination by the client device 1. In this case, the administration node 4 assigns a virtual node in accordance with the storage capacity of each node. Further, the virtual node number, and the virtual node numeral are assigned in accordance with the logical data capacity to be set in each node.

For instance, when a system is constituted of four nodes i.e. two reference nodes, and two nodes, each of which has a logical data capacity of two times of the capacity of the reference node, it is assumed that one virtual node is assigned to each one of the reference nodes, and two virtual nodes are assigned to each one of the nodes whose logical capacity is two times. In this system, six virtual nodes in total are necessary.

For instance, virtual nodes are assigned as follows.
reference node 1: virtual node 1
reference node 2: virtual node 2
node 1 whose logical capacity is two times: virtual nodes 3 and 4
node 2 whose logical capacity is two times: virtual nodes 5 and 6

The numeral of each virtual node is a result (value) to be obtained by the arithmetic expression, and a correspondence between a virtual node and each node serves as storage information of the storage unit 14.

These information items are set by the operation administrator of the system, and are setting information to be set in advance by the administration node 4.

The administration node 4 administers the storages nodes 5 and 6 via the network 2 on the basis of the aforementioned configuration.

The functions provided in the administration node 4 may be imparted to one of the storage nodes 5.

Figure 3:
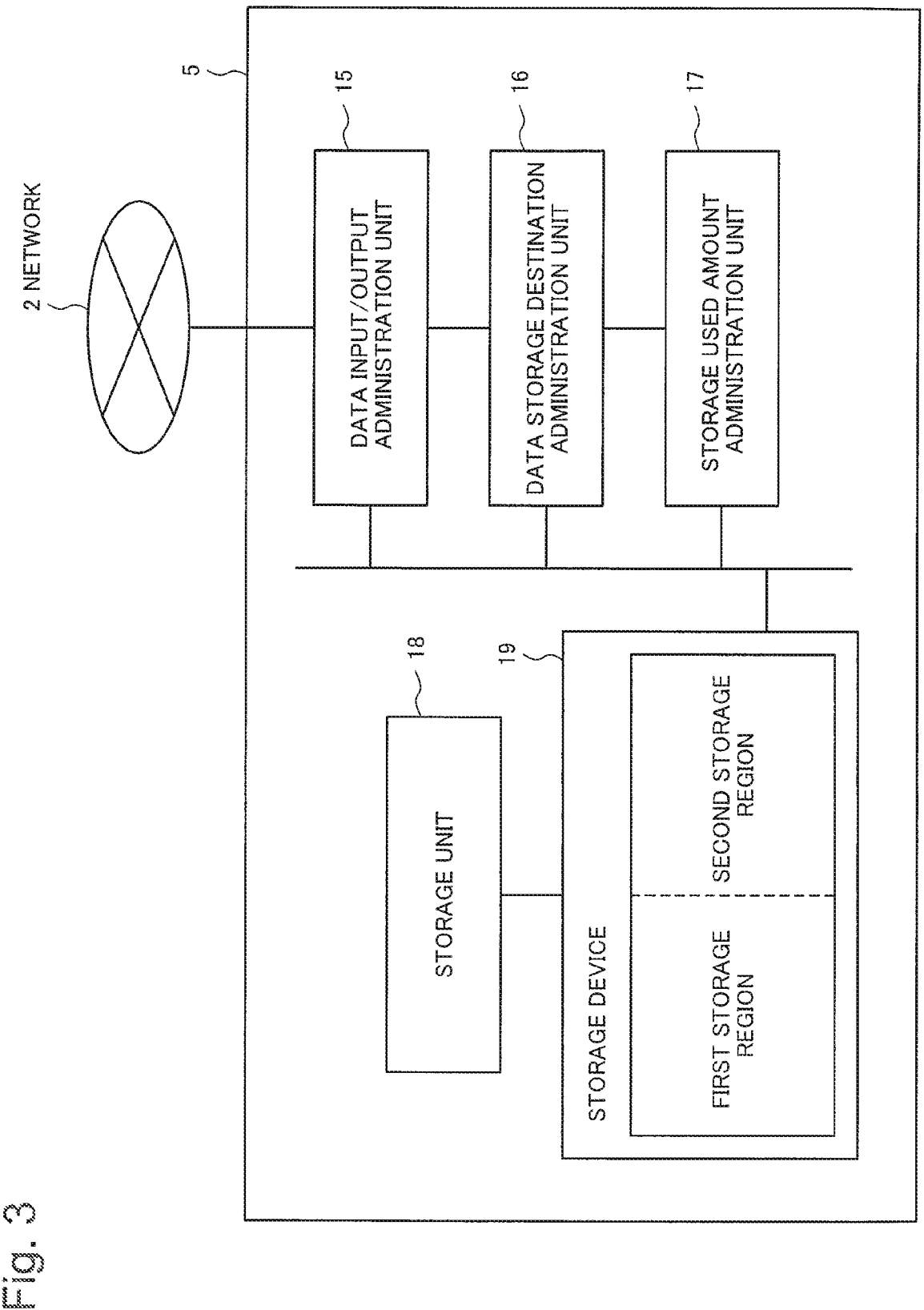
FIG. 3 is a block diagram illustrating a configuration of a storage node in the first exemplary embodiment of the invention.

FIG. 3 is a block diagram illustrating a configuration of the storage node 5. The storage node 5 includes a data input/output administration unit 15, a data storage destination administration unit 16, a storage used amount administration unit 17, and a storage unit 18 having a storage device 19. Each of the units is connected to an internal bus of the storage node 5.

As illustrated in FIG. 3, each of the storage nodes 5 is connected to the storage device 19. The storage node 5 administers data stored in the storage device 19, and provides the administered data to the client device 1 via the network 2.

Further, the storage node 5 administers data while giving redundancy to the data. That is, data of the same contents is administered by at least two storage nodes.

The storage device 19 is constituted of a hard disk drive (HDD) alone, instead of using a disk array. Alternatively, a storage device may be constituted of devices having different performances (e.g. combination of an SSD and an HDD).

Further, the storage device 19 may be a RAID (Redundant Arrays of Inexpensive Disks) system incorporated with a plurality of HDDs. Alternatively, a disk array may be configured, using a technique other than RAID. In the exemplary embodiment, a storage device provides disk administration services of a hard disk drive (HDD) alone.

The data input/output administration unit 15 administers input/output of data which are transmitted/received via the network 2.

When the system configuration is changed due to addition or failure of a storage node in the distributed data storage system 3, the client device 1 does not hold the system configuration information which reflects the system configuration change that has occurred in the administration node 4. Further, the client device 1 may transmit a writing command to an unintended node.

In view of the above, the data input/output administration unit 15 performs calculation on the basis of an arithmetic algorithm using the data ID included in a writing command transmitted to the own node as an input, performs a matching operation between the calculation result value and the storage information included in the system configuration information provided from the administration node 4, and determines whether the data access request is a request to the own node.

That is, when the calculation result value matches the storage information, the data input/output administration unit 15 determines that the data access request is a request to the own node, and transmits the data ID and the data read/write command to the data storage destination administration unit 16 in response to the data access request.

When the calculation result value does not match the storage information, the data input/output administration unit 15 determines that the data access request is not a request to the own node, and transmits an error message indicating that the own node is not a data storage destination to the client device 1.

When the client device 1 acquires the error message, the client device 1 requests the administration node 4 to transmit the latest system configuration information, and gives an ID to the data subject to be written. Further, the client device 1 calculates a value representing a data storage destination, using a predetermined arithmetic expression, and using the ID as input data in order to calculate the data storage destination.

The client device 1 reconfigures the setting of the data storage destination by performing a matching operation between the value calculated by the arithmetic expression, and the storage information included in the latest system configuration information transmitted from the administration node 4.

The client device 1 reads and writes data by retransmitting the ID and the data subject to be written together with a writing command to the storage node 5 which becomes a re-set data storage destination for data.

The data storage destination administration unit 16 administers a table which associates physical addresses as data storage destinations of the storage device 19 of the own node with IDs of data subject to be written requested by the data input/output administration unit 15.

The data storage destination administration unit 16 reads and writes data from the storage device 19 in accordance with the ID of data designated by the data input/output administration unit 15 and with a data read/write command, and replies to the command given to the data input/output administration unit 15.

The aforementioned table is a general data administration table in which data IDs, physical addresses of storage devices, and access frequency information are associated with each other. The data storage destination administration unit 16 can extract physical addresses of storage devices and access frequency information, using data IDs as an input.

When a data access request indicating a request to read and write data is received with respect to each ID of data which are administered by the table, the data storage destination administration unit 16 registers the request in the table, as access frequency information with respect to the ID of data.

The storage used amount administration unit 17 administers vacant addresses of the storage device 19.

When a new data writing request is transmitted from the data input/output administration unit 15 to the data storage destination administration unit 16, the data storage destination administration unit 16 acquires a vacant address from the storage used amount administration unit 17, and writes data in the storage device 19.

The address to which data is written in the storage device 19 is administered as the address being used by the storage used amount administration unit 17.

When the storage node 5 is incorporated in the distributed data storage system 3, the storage used amount administration unit 17 classifies all the addresses in the storage device 19 into addresses for a first storage region, and addresses for a second storage region based on the logical data capacity included in the system configuration information to be transmitted from the administration node 4. In this case, the storage used amount administration unit 17 classifies the addresses in such a manner that the logical data capacity satisfies the capacity of the first storage region and the capacity of the second storage region.

The storage device 19 is constituted of a general storage device such as an HDD or an SSD. Alternatively, the storage device 19 may be constituted of different devices in combination. When combination of different devices is used, the storage used amount administration unit 17 assigns a device having higher I/O performance as a device for the first storage region.

Alternatively, the newly-introduced storage node 6 to be may be implemented using the same hardware configuration as the existing storage node 5.

Figure 4:
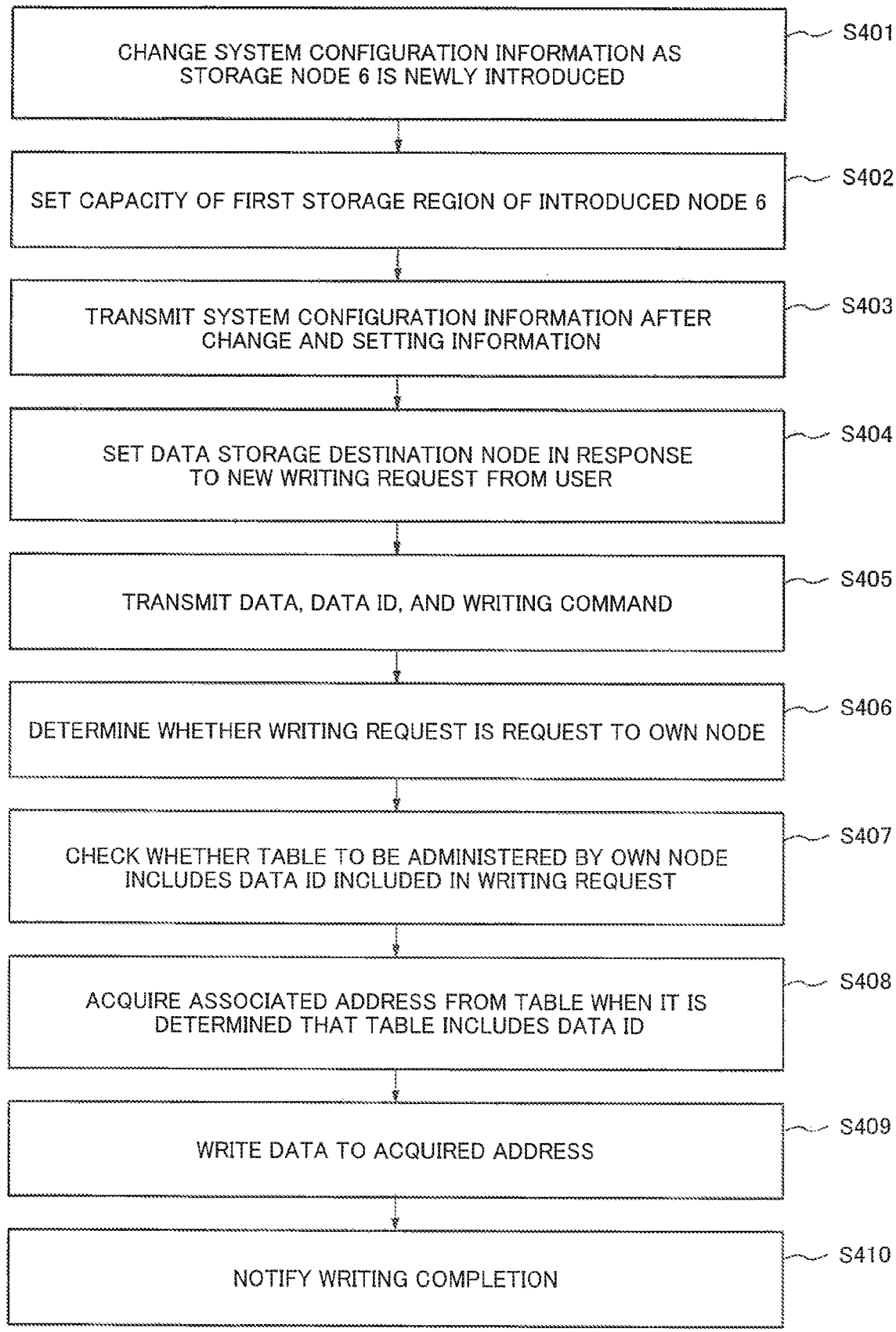
FIG. 4 is a flowchart illustrating a data writing operation in the first exemplary embodiment of the invention.
Figure 5:
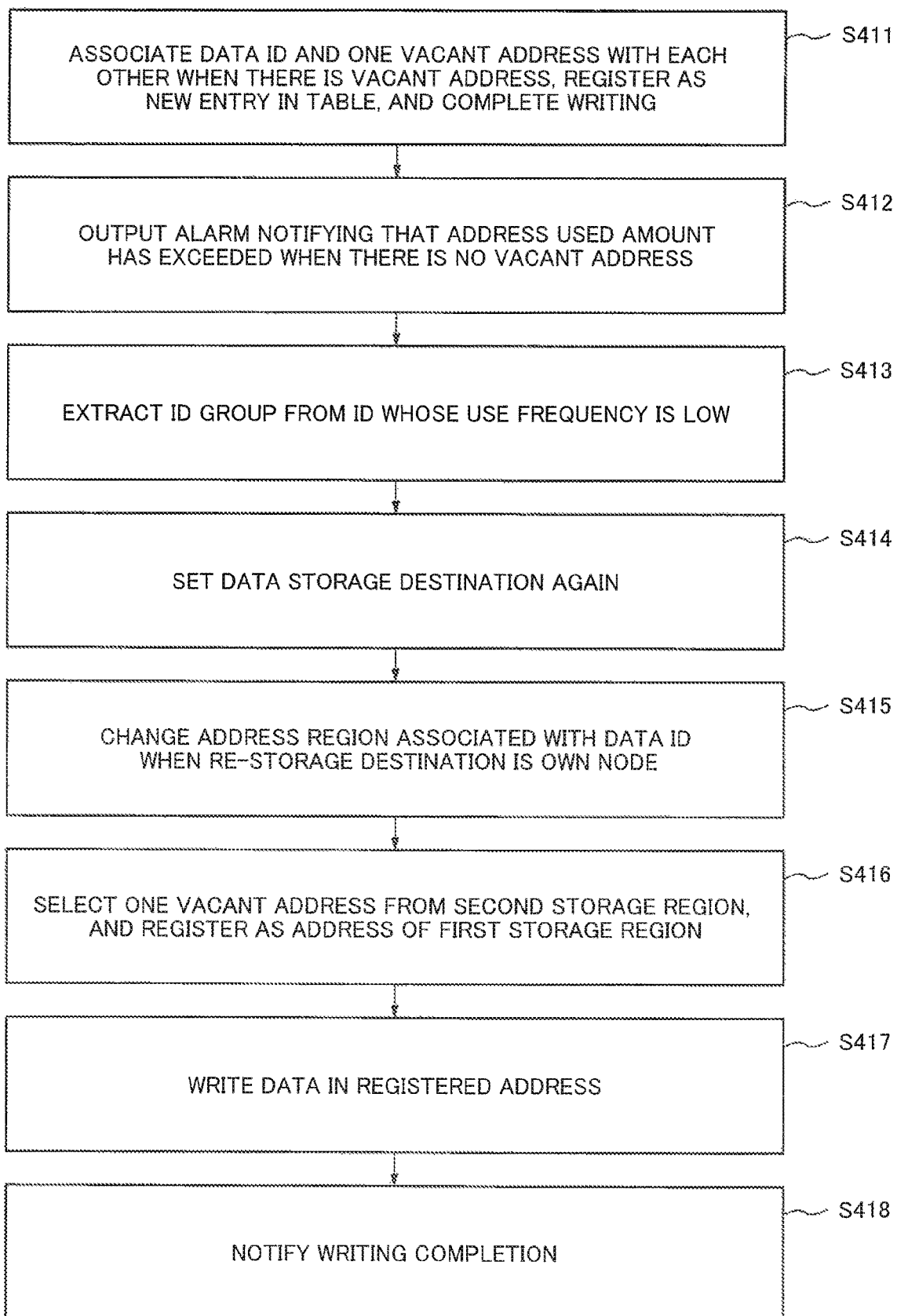
FIG. 5 is a flowchart illustrating a part of the data writing operation in the first exemplary embodiment of the invention.
Figure 6:
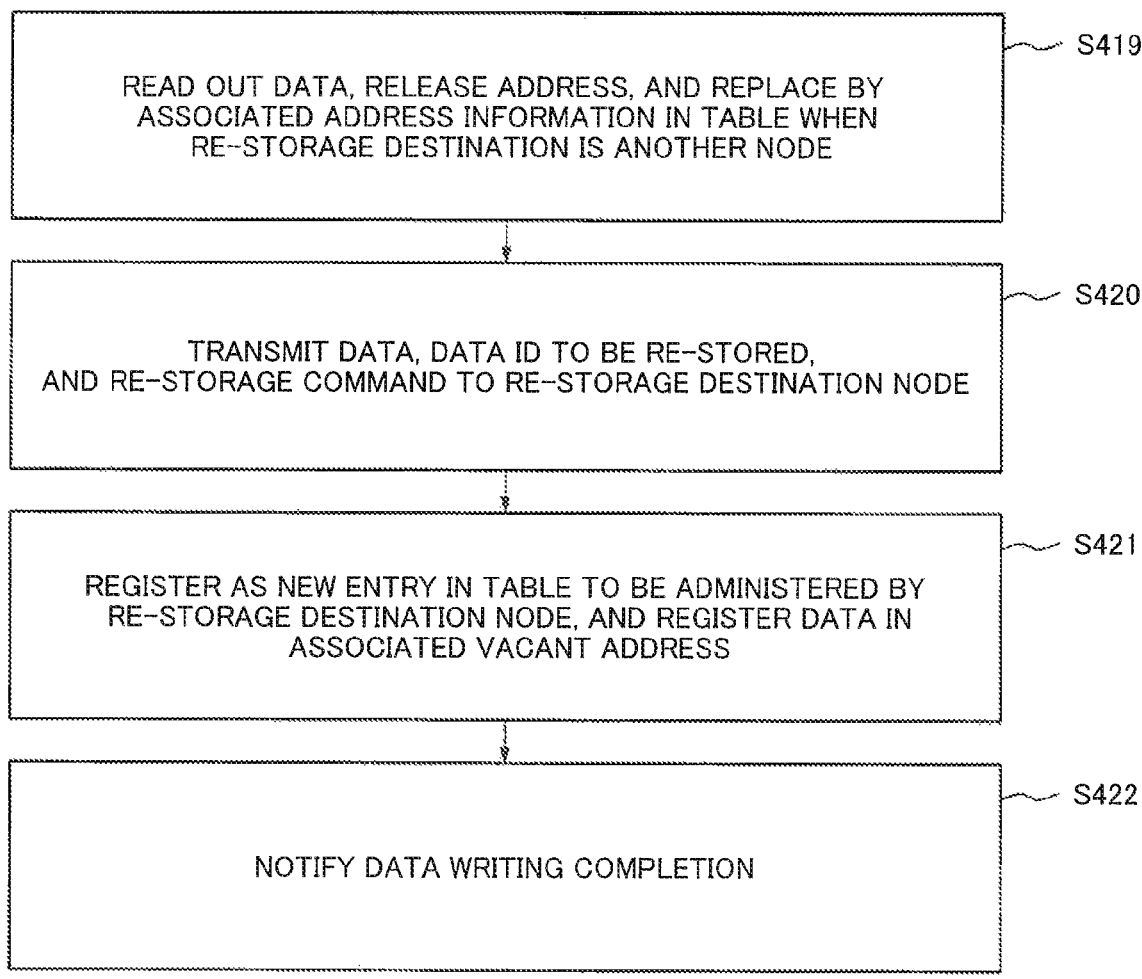
FIG. 6 is a flowchart illustrating another part of the data writing operation in the first exemplary embodiment of the invention.

FIG. 4 to FIG. 6 are flowcharts illustrating a data writing process from the client device 1 to the distributed data storage system 3 when a storage node 6 having a different I/O performance is newly introduced. In the following, the process illustrated in FIG. 4 to FIG. 6 is described in accordance with the flowcharts.

(Step S401)

As illustrated in FIG. 1, it is assumed that a storage node 6 is newly introduced to the distributed storage system 3. As the I/O performance value of an existing storage node 5, logical capacity of the distributed storage system 3 is 10. I/O performance of the storage node 6 is 20. In this case, the administration node 4 sets system configuration information which reflects a system configuration change due to addition of the storage node 6 having a different performance as described above.

(Step S402)

The administration node 4 divides the storage device administered by the newly introduced storage node 6 into a first storage region and a second storage region, and assigns the capacities to the first storage region and to the second storage region respectively based on the following conditions.

The following conditions are rules for setting a capacity which is assigned to each node. When the administration node 4 sets a capacity which is assigned to each node, the administration node 4 sets the capacities to match the I/O performance values of nodes constituting the system, as a part of the information included in the system configuration information which is administered by the administration node 4. That is, the administration node 4 sets the capacities based on the following rules.

Condition 1) The administration node 4 determines the I/O performance value of the storage node 5 serving as a reference storage node. Subsequently, when the I/O performance of the storage node 6 having a different I/O performance is N times of the I/O performance of the reference storage node 5, the administration node 4 sets the logical capacity of the first storage region of the storage node 6 having a different I/O performance to be N times of the logical capacity of the reference node (where N is a positive integer larger than 0).

For instance, when the I/O performance of the storage node 6 is two times of that of the reference storage node 5, the administration node 4 sets the logical capacity of the first storage region of the storage node 6 having a different I/O performance to be two times of the logical capacity of the reference node to match the I/O performance of the storage node 6. As a result, it is possible to solve the problem such that the performance of a node having a different I/O performance becomes a bottleneck. This is advantageous in maintaining the performance of the entire system.

Condition 2) In the condition 1), when the capacity of the storage device within the storage node 6 having a different I/O performance is N times or more of the capacity of the storage device within the reference storage node 5, the administration node 4 sets the remaining capacity which exceeds N times of the capacity of the reference storage node 5 in the storage node 6 as the second storage region, and does not set a second storage region in the reference storage node 5 (namely, the reference storage node does not become a data re-storage destination).

For instance, when the capacity of the storage device within the storage node 6 having a different I/O performance is two times or more of that of the storage device within the reference storage node 5, the administration node 4 sets the remaining capacity which exceeds two times in the storage node 6 as the second storage region.

In this way, the storage node 6 can hold the capacity of two times in the first storage region to match the I/O performance. Thus, it is possible to solve the problem such that the performance of the storage node 6 having a different I/O performance becomes a bottleneck. This is advantageous in maintaining the performance of the entire system.

Condition 3) In the conditions 1) and 2), when the second storage region is set in the reference storage node 5, the capacity of N times of the capacity assigned to the first storage region of the reference storage node is assigned as the capacity of the first storage region of the storage node 6 having a different I/O performance.

For instance, when the I/O performance of the storage node 6 is two times of that of the reference storage node 5, the logical capacity of the first storage region of the storage node 6 is set as two times of the capacity assigned to the first storage region of the reference storage node 5.

In this way, the storage node 6 can hold the capacity of two times in the first storage region to match the I/O performance. Thus, it is possible to solve the problem such that the performance of the storage node 6 having a different I/O performance becomes a bottleneck. This is advantageous in maintaining the performance of the entire system.

Condition 4) In the condition 1), when the capacity of the storage device within the storage node 6 having a different I/O performance is N times or less of the capacity of the storage device within the reference storage node 5, the administration node 4 assigns all the capacities as the first storage region, using the capacity of the storage device within the storage node 6 having a different I/O performance as the upper limit.

For instance, when the I/O performance of the storage node 6 is two times of that of the reference storage node 5, and the capacity of the storage device within the storage node 6 having a different I/O performance is two times or less of the capacity of the storage device within the reference storage node 5, the administration node 4 assigns all the capacities as the first storage region, using the capacity of the storage device within the storage node 6 having a different I/O performance as the upper limit.

In this way, it is possible to match the I/O performance of the storage node 6, while maximally using the capacity of the storage device within the storage node 6 having a different I/O performance. Thus, it is possible to maximally reduce the problem such that the performance of the storage node 6 having a different I/O performance becomes a bottleneck. This is advantageous in maximally maintaining the performance of the entire system.

Condition 5) In the conditions 1) and 4), the capacity of 1/N-th of the capacity of the first storage region of the storage node 6 having a different I/O performance is assigned as the capacity of the first storage region of the reference storage node.

For instance, it is assumed that the I/O performance of the storage node 6 is two times of that of the reference storage node 5, and the capacity of the storage device within the storage node 6 having a different I/O performance is two times or less of that of the storage device within the reference storage node 5. In this case, the administration node 4 assigns the capacity of one-half of the capacity of the first storage region of the storage node 6 having a different I/O performance, as the capacity of the first storage region of the reference storage node 5.

Therefore, as well as the condition 1), the administration node 4 can set the logical capacity to match the I/O performance. As a result, it is possible to solve the problem such that the performance of a node having a different I/O performance becomes a bottleneck. This is advantageous in maintaining the performance of the entire system.

Condition 6) When there is a storage node 6 having three or more different I/O performances and three or more different storage logical capacities, a node having a lowest I/O performance is set as the reference storage node, and the capacity of the first storage region and the capacity of the second storage region are set based on of the conditions 1) to 5).

According to the setting condition, a node having a lowest I/O performance is set as the reference storage node. Therefore, it is easy to set the logical capacity of the first storage region of the storage node having the lowest capacity to match the I/O performance of the reference storage node based on the conditions 1) to 5).

Therefore, it is possible to solve the problem such that the performance of a storage node having a different I/O performance becomes a bottleneck. This is advantageous in maintaining the performance of the entire system.

Condition 7)

When the combination of the storage nodes 5 and 6 is a combination of storage nodes that does not satisfy the conditions 1) to 6), a storage node having a lowest storage capacity is set as the reference storage node.

According to the aforementioned setting condition, a storage node having the lowest storage capacity is set as the reference storage node. According to this configuration, the administration node 4 sets the I/O performance of a storage node in accordance with the capacity of the reference storage node. Therefore, the problem such that a storage node becomes a bottleneck are easily solved.

When a storage device is constituted of devices having different performances within a storage node (e.g. a case such that an SSD and a HDD are combined), the administration node 4 sets the capacity of the first storage region and the logical capacity of the second storage region according to the conditions 1) to 6) based on the I/O performance and the storage logical capacity, assuming that only a device having a highest I/O performance is used.

In the exemplary embodiment, as an example, the administration node 4 sets the capacities based on the condition 1). That is, the administration node 4 sets the logical capacity of the first storage region of the storage node 6 to be introduced at 20, which is two times of the capacity of the reference storage node 5.

As a result, it is possible to set the logical capacity of the newly introduced storage node 6 to match the I/O performance. Thus, there is no difference between the logical capacity of the storage node 6 and the I/O performance.

(Step S403)

The administration node 4 transmits system configuration information which has been changed, and setting information such as the logical capacity of the first storage region to the client device 1 and to all the storage nodes 5 and 6. Alternatively, the administration node 4 may transmit system configuration information which has been changed or setting information to the client device 1 or to the storage nodes 5 and 6 in response to a transmission request of these information items from the client device 1 or from the storage nodes 5 and 6.

(Step S404)

When the user requests a new writing request, the client device 1 gives an ID to the data subject to be written, and sets the storage node 5 as a data storage destination based on a predetermined arithmetic expression, and system configuration information acquired from the administration node 4, using the ID as input data.

(Step S405)

The client device 1 transmits the ID and the data subject to be written together with a writing command to the storage node 5 as the data storage destination set in Step S404.

(Step S406)

The data input/output administration unit 15 in the storage node 5 performs calculations by an arithmetic algorithm, using the data ID included in the writing command transmitted to the storage node 5 itself as an input. Further, the data input/output administration unit 15 performs a matching operation between the calculated value and the storage information included in the system configuration information from the administration node 4, and determines whether the data access request is a request to the storage node 5 itself.

When it is determined that the calculated value matches the storage information, the data input/output administration unit 12 determines that the storage node 5 is the data storage destination. Then, the data input/output administration unit 15 transfers the writing request transmitted from the client device 1 to the data storage destination administration unit 16.

(Step S407)

The data storage destination administration unit 16 checks whether the table in which data IDs and the storage device 19 are associated with each other includes the data ID included in the writing request.

<A Case Where the Data ID Included in a Writing Request Exists in the Table>

(Step S408)

The data storage destination administration unit 16 acquires an address associated with the table.

(Step S409)

The data storage destination administration unit 16 writes the data included in the writing request to the appropriate address in the storage device 19 on the basis of the acquired address.

(Step S410)

The data storage destination administration unit 16 transfers writing completion to the data input/output administration unit 15. In response to writing completion, the data input/output administration unit 15 notifies the client device 1 of writing request completion.

<A Case Where the Data ID Included in a Writing Request Does not Exist in the Table t>

(Step S411)

As illustrated in FIG. 5, the data storage destination administration unit 16 acquires a vacant address from the first storage region, using the storage used amount administration unit 17. Then, the data storage destination administration unit 16 associates the ID included in the data writing request with the vacant address, and registers the vacant address in the table as a new entry. Thus, the writing operation is completed.

(Step S412)

When the used amount of the first storage region exceeds a predetermined amount, and when the used amount of the storage device secured as the first storage region exceeds a predetermined used amount, in other words, when the number of vacant addresses is equal to or lower than a predetermined number, the storage used amount administration unit 17 outputs an alarm notifying that the used amount has exceeded a predetermined amount to the data storage destination administration unit 16.

(Step S413)

The data storage destination administration unit 16 refers to the access frequency information of each ID, which is administered in the table which associates IDs with data storage destination addresses to the storage device 19, using the alarm as a trigger. Then, the data storage destination administration unit 16 extracts an ID group of a predetermined data amount from the ID whose access frequency is lowest.

(Step S414)

The data storage destination administration unit 16 performs cyclic bit shift with respect to binary data constituting the extracted IDs by a predetermined number of times. Thereafter, the data storage destination administration unit 16 newly sets a data storage destination, using the system configuration information shared between the client device 1, the storage nodes 5 and 6, and the administration node 4, and using the arithmetic data storage destination setting method, with use of the data having the shifted ID as input data. The storage destination becomes the re-storage destination of data identified by the ID.

<A Case Where the Re-Storage Destination is the Own Node>

(Step S415)

As illustrated in FIG. 5, the data storage destination administration unit 16 notifies the storage used amount administration unit 17 that the address associated with the ID is re-assigned from the first storage region to the second storage region.

(Step S416)

In response to the notification, the storage used amount administration unit 17 registers the associated address as the address of the second storage region, selects one of the vacant addresses from the addresses assigned to the second storage region, and registers the selected address as the address of the first storage region.

However, when the storage device 19 is constituted of devices having different performances, the data storage destination administration unit 16 may re-store the data from the first storage region to the second storage region.

(Step S417)

The data storage destination administration unit 16 writes the data included in the writing request to the address registered as the address of the first storage region.

(Step S418)

The data storage destination administration unit 16 transfers writing completion to the data input/output administration unit 15. In response to the writing completion, the data input/output administration unit 15 notifies the client device 1 of writing request completion.

<A Case Where the Re-Storage Destination Set in Step S414 is Distinct Storage Node 6>

(Step S419)

As illustrated in FIG. 6, the data storage destination administration unit 16 reads out the data associated with the ID from the storage device 19, and notifies the storage used amount administration unit 17 that the address associated with the ID is released (in other words, the address becomes a vacant address). Further, the data storage destination administration unit 16 replaces the address information with an identifier representing that data is re-stored in the table which administers, the IDs and the address information of the storage device 19 that are associated with each other.

(Step S420)

Subsequently, the data storage destination administration unit 16 transfers, to the storage node 6 as a re-storage destination, the data readout from the storage device 19 and the ID to which cyclic bit shift has been performed and re-storage together with a re-storage command via the data input/output administration unit 12.

(Step S421)

The data input/output administration unit 15 in the storage node 6 as the re-storage destination receives the re-storage request, and then transfers the request to the data storage destination administration unit 16.

The data storage destination administration unit 16 acquires a vacant address from the addresses secured as the second storage region, using the storage used amount administration unit 17, registers the vacant address as a new entry in the table in which IDs and addresses are associated with each other, and then, stores the data in the vacant address.

In this case, when it is necessary to store the data in the first storage region, the data storage destination administration unit 16 may acquire a vacant address from the first storage region, and may store the data in the vacant address.

(Step S422)

The process completion notification in Step S421 is transferred to the storage node 5 as the re-storage destination via the data input/output administration unit 15. In response to writing completion notification, the storage node 5 as the re-storage destination notifies the client device 1 of writing request completion.

When the distributed data storage system as the first exemplary embodiment of the invention is constituted of a storage node group having different I/O performances, the administration node 4 can set the logical capacity of a storage node based on the data access I/O number in accordance with a difference between the logical capacity of the storage node, and each of the I/O performances.

Based on the aforementioned setting, it is possible to solve the problem such that the performance of a storage node becomes a bottleneck. This is advantageous in maintaining the performance of the entire system.

Second Embodiment

Next, the second exemplary embodiment of the invention is described in detail referring to the drawings. Concerning the description about the second exemplary embodiment, the second exemplary embodiment of the invention has the same system configuration and the same operation steps as those of the first exemplary embodiment of the invention except for the configuration of a storage node administration device 700 in the second exemplary embodiment and the configuration of the administration node in the first exemplary embodiment. Therefore, detailed description about the same configuration of the second exemplary embodiment is omitted.

Figure 7:
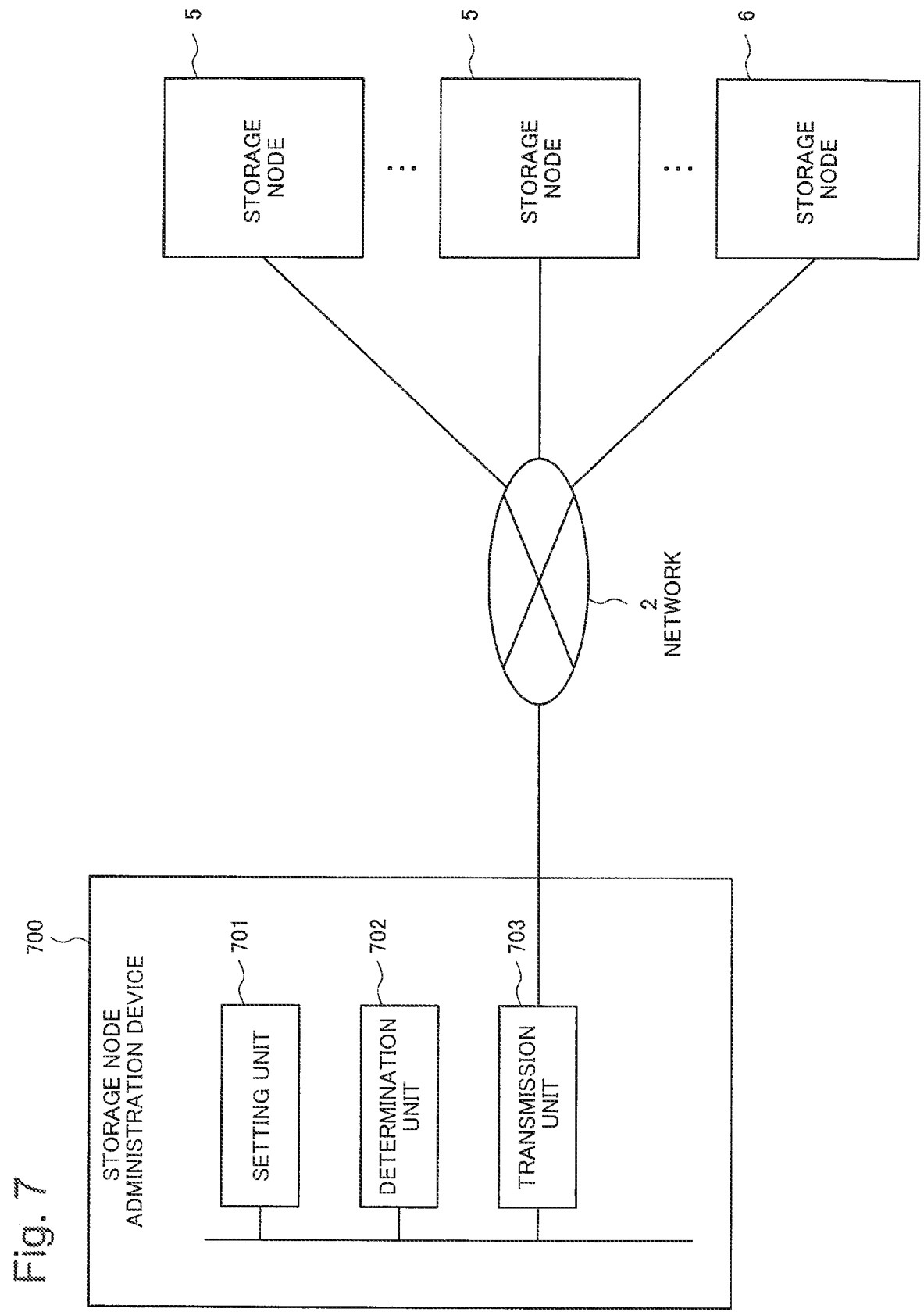
FIG. 7 is a block diagram illustrating a configuration of a storage node administration device in a second exemplary embodiment of the invention.

FIG. 7 is a block diagram illustrating a configuration of the storage node administration device 700 in the second exemplary embodiment of the invention. As illustrated in FIG. 7, the storage node administration device 700 includes a setting unit 701, a determination unit 702, and a transmission unit 703.

The storage node administration device 700 is connected to a plurality of storage nodes 5 and 6 via a network 2.

The administrator of a distributed data storage system 3 operates the storage node administration device 700. In response to the operation, the storage node administration device 700 accesses to the storage nodes 5 and 6 having different I/O performances, and sets system configuration information to carry out various settings necessary for operating the system.

When a system configuration of the distributed data storage system 3 is changed due to setting, addition or failure of a storage node having different I/O performance, the setting unit 701 display the system configuration information to a screen of a monitor.

The system configuration information is constituted of "logical data capacity", "IP address information of storage nodes", "activation/non-activation of storage nodes", and "storage information which associates calculation result values with data storage destinations are based on calculation results by a predetermined arithmetic expression".

Then, the setting unit 10 sets latest system configuration information which reflects a system configuration change due to setting, addition, failure of a storage node or the like. Further, the setting unit 10 divides the storage region of the set or added storage node into a first storage region and a second storage region, and performs settings on the logical capacity of each region.

The determination unit 702 determines the system configuration information which reflects a configuration change of the distributed data storage system 3 based on the information set by the setting unit 701.

The transmission unit 703 transmits the information set by the setting unit 701 and the system configuration information determined by the determination unit 702 to the client device 1 or to each of the storage nodes 5 and 6 via the network 2.

When the distributed data storage system in the second exemplary embodiment of the invention is constituted of a storage node group having different I/O performances, the storage node administration device 700 is capable of setting the logical capacity of a storage node based on the data access I/O number in accordance with a difference between the logical capacity of the storage node and each of the I/O performances.

As described above, according to the second exemplary embodiment of the invention, it is possible to set the data storage capacity of a storage node based on the data access I/O number in accordance with a difference between the logical capacity of the storage node and each of the I/O performances.

Similarly, when the distributed data storage system is in operation, it is possible to avoid addition of an unnecessary node, as far as the capacity of a storage node which has already been incorporated in the system or the I/O performance resources of the storage node is in a state that are not consumed.

Thus, it is possible to eliminate or minimize the difference between the logical capacity of a storage node constituting the distributed data storage system, and the I/O performance. According to this, it is possible to assign the resources in such a manner that the H/W performance of each storage node is maximized. Thus, it is possible to enhance the entire performance of the distributed data storage system in both aspects of the storage capacity and the I/O performance.

Further, in each exemplary embodiment of the invention, the processing functions described referring to each flowchart can be implemented by a computer. In this case, there is provided a program describing the processing contents of the functions which should be included in the storage nodes 5 and 6, the administration node 4, and the storage node administration device 700.

Figure 8:
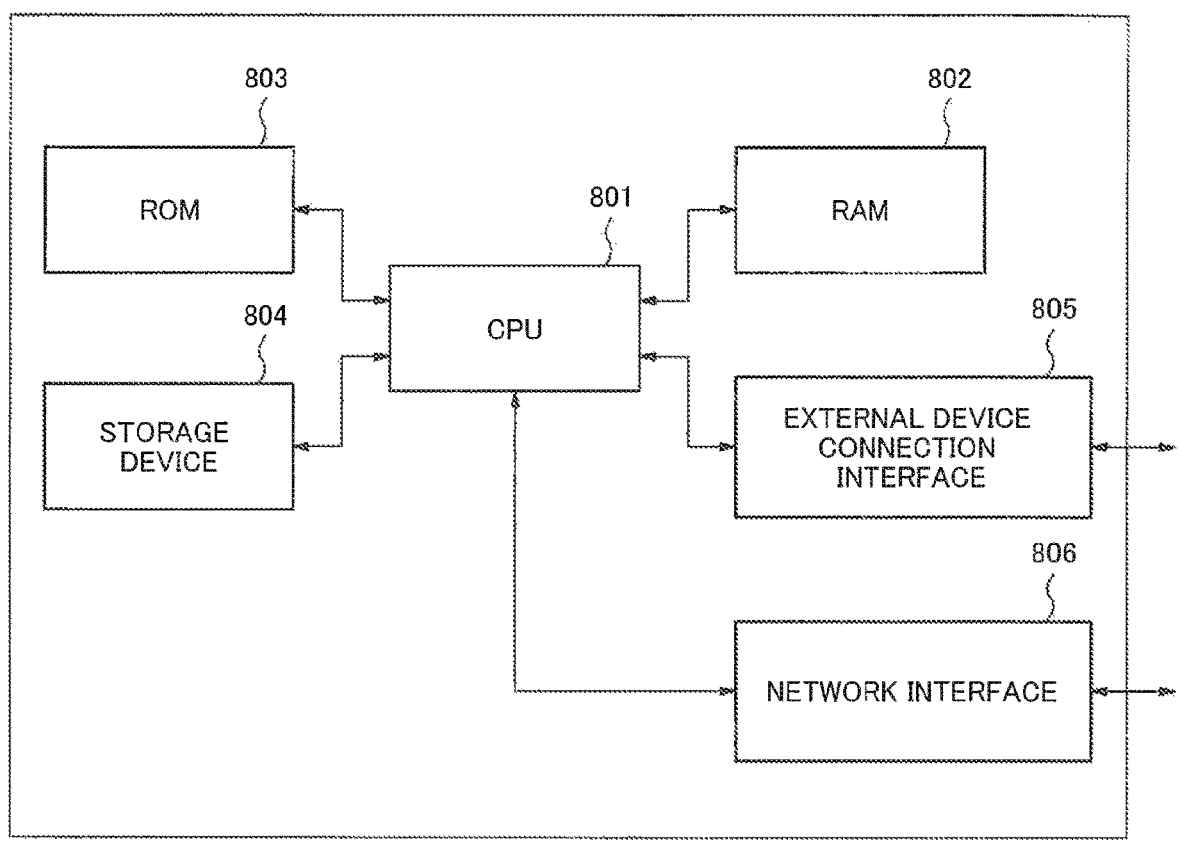
FIG. 8 is a circuit block diagram of a computer device of a administration node 4 in the first exemplary embodiment of the invention, or a circuit block diagram of a computer device of a storage node administration device 700 in the second exemplary embodiment of the invention.

FIG. 8 is a circuit block diagram of a computer device of the administration node 4 in the first exemplary embodiment of the invention, or a circuit block diagram of a computer device of the storage node administration device 700 in the second exemplary embodiment of the invention.

As illustrated in FIG. 8, the processing functions of the administration node 4 in the first exemplary embodiment of the invention, or the processing functions of the storage node administration device 700 in the second exemplary embodiment are executed by causing a CPU 801 (Central Processing Unit) to write a computer program stored in an ROM 803 (Read Only Memory) or in a storage device (HDD) on an RAM 802 (Random Access Memory). Thus, the processing functions are implemented on a computer.

Further, it is possible to record a program describing the contents for implementing the processing functions on a computer-readable recording medium. Examples of the computer-readable recording medium are a magnetic recording device, an optical disc, a magneto-optical recording medium, and a semiconductor memory.

The magnetic recording device includes an HDD, a flexible disk (FD), and a magnetic tape (MT). The optical disc includes a DVD (Digital Versatile disc), a DVD-RAM, a CD-ROM (Compact Disc-Read Only Memory), and a CD-R (Recordable)/RW (Rewritable). The magneto-optical recording medium includes an MO (Magneto-Optical disk).

When the program is distributed, for instance, portable recording media such as a DVD or a CD-ROM recorded with the program are sold. Further, it is possible to store the program in a server computer, and to transfer the program from the server computer to another computer via a network.

A computer that executes the program stores, for instance, a program recorded in a portable recording medium or a program transferred from a server computer in a storage device of the computer.

The computer reads the program from the storage device of the computer, and executes the processing in accordance with the program. The computer may also directly read a program from a portable recording medium, and execute the processing in accordance with the program.

The computer may also successively execute the processing in accordance with a received program, each time the program is transferred from a server computer.

The exemplary embodiments of the invention are as described above. However, the exemplary embodiments merely describe the principle of the invention. The invention is not limited to the aforementioned configurations and application examples thereof. A number of modifications and alterations are applicable to a person skilled in the art.

For instance, the invention is applicable to a case, in which storage nodes having different capacities and different I/O performances are incorporated in a distributed data storage system from the beginning.

Further, it is needless to say that the invention is applicable to a case, in which the system configuration information is changed due to failure of a storage node being operated in the system, and it is required to reset the logical capacity of another storage node.

Further, all the relevant modifications and equivalents fall in the scope of the invention as defined in the appended claims and equivalents thereof. Further, it is possible to replace the configuration of each unit by any other configuration having the same functions.

Further, any other components or steps may be added to the invention, as necessary. Further, the invention may be a combination of any two or more of the configurations (features) in the aforementioned exemplary embodiments.

The following Supplemental Notes are disclosed regarding the exemplary embodiments.

(Supplemental Note 1)

A storage node administration device, including:

a setting means which sets at least one reference storage node from the storage nodes having different I/O performances when a distributed data storage system including a plurality of storage nodes having different I/O performances is configured, divides a storage region of the storage nodes other than the reference storage node into a first storage region and a second storage region, referring to the I/O performance and a logical capacity of the reference storage node, and sets a logical capacity of the first storage region and a logical capacity of the second storage region to match the I/O performance of the storage nodes other than the reference storage node;

a determination means which determines system configuration information reflecting a configuration change of the distributed data storage system based on information set by the setting means; and a transmission means which transmits the system configuration information determined by the determination means to the storage nodes having different I/O performances.

(Supplemental Note 2)

The storage node administration device according to Supplemental Note 1, wherein the setting means sets the logical capacity of the first storage region of the storage nodes other than the reference storage node to be N times of the logical capacity of the reference storage node when the I/O performance of the storage nodes other than the reference storage node is N times of the I/O performance of the reference storage node.

(Supplemental Note 3)

The storage node administration device according to Supplemental Note 1 or 2, wherein the setting means sets a remaining capacity that exceeds N times of the logical capacity of the reference storage node in the second storage region of the storage nodes other than the reference storage node when the logical capacity of the storage nodes other than the reference storage node is N times or more of the logical capacity of the reference storage node.

(Supplemental Note 4)

The storage node administration device according to any one of Supplemental Notes 1 to 3, wherein the setting means sets a capacity of N times of a logical capacity set in the first storage region of the reference storage node as the logical capacity of the first storage region of the storage nodes other than the reference storage node when a first storage region and a second storage region are set in the reference storage node.

(Supplemental Note 5)

The storage administration device according to any one of Supplemental Notes 1 to 4, wherein the setting means sets the storage node having the lowest I/O performance, as the reference storage node, and sets the logical capacity of the first storage region and the logical capacity of the second storage region in such a manner that the I/O performances and the storage capacities of all the storage nodes are maximally approximated when there is a storage node having three or more different I/O performances and three or more different storage capacities.

(Supplemental Note 6)

The storage administration device according to any one of Supplemental Notes 1 to 5, wherein the setting means sets a node having the lowest storage capacity as the reference storage node, and sets the logical capacity of the first storage region and the logical capacity of the second storage region in such a manner that the I/O performances and the storage capacities of all the storage nodes are maximally approximated when the storage nodes having a large performance difference are combined.

(Supplemental Note 7)

A storage node logical capacity setting method including:

setting at least one reference storage node from the storage nodes having different I/O performances when a distributed data storage system is constituted of a plurality of storage nodes having different I/O performances; and dividing a storage region of the storage nodes other than the reference storage node into a first storage region and a second storage region, referring to the I/O performance and a logical capacity of the reference storage node, and setting a logical capacity of the first storage region and a logical capacity of the second storage region to match the I/O performance of the storage nodes other than the reference storage node.

(Supplemental Note 8)

The storage node logical capacity setting method according to Supplemental Note 7, wherein a logical capacity of a first storage region of the storage nodes other than the reference storage node is set to be N times of the logical capacity of the reference storage node when the I/O performance of the storage nodes other than the reference storage node is N times of the I/O performance of the reference storage node.

(Supplemental Note 9)

The storage node logical capacity setting method according to Supplemental Note 7 or 8, wherein a remaining capacity that exceeds N times of the storage capacity of the reference storage node is set in the second storage region of the storage nodes other than the reference storage node when the storage logical capacity of the storage nodes other than the reference storage node is N times or more of the storage capacity of the reference storage node.

(Supplemental Note 10)

The storage node logical capacity setting method according to any one of Supplemental Notes 7 to 9, wherein a capacity of N times of a capacity set in the first storage region of the reference storage node is set as the capacity of the first storage region of the storage nodes other than the reference storage node when a first storage region and a second storage region are set in the reference storage node.

(Supplemental Note 11)

A program that causes a computer to execute:

a process of setting at least one reference storage node from the storage nodes having different I/O performances when a distributed data storage system including a plurality of storage nodes having different I/O performances is configured,;

and a process of dividing a storage region of the storage nodes other than the reference storage node into a first storage region and a second storage region, referring to the I/O performance and a logical capacity of the reference storage node, and setting a logical capacity of the first storage region and a logical capacity of the second storage region to match the I/O performance of the storage nodes other than the reference storage node.

(Supplemental Note 12)

A recording medium recorded with a program that causes a computer to execute:

a process of setting at least one reference storage node from the storage nodes having different I/O performances when a distributed data storage system including a plurality of storage nodes having different I/O performances is configured; and a process of dividing a storage region of the storage nodes other than the reference storage node into a first storage region and a second storage region, referring to the I/O performance and a logical capacity of the reference storage node, and setting a logical capacity of the first storage region and a logical capacity of the second storage region to match the I/O performance of the storage nodes other than the reference storage node.

(Supplemental Note 13)

A storage node, including:

a storage means including a storage device which is divided into first storage region and a second storage region by the storage administration device according to any one of Supplemental Notes 1 to 6;

a data input/output administration means which determines, in response to an access request to data to be stored in the storage means, whether the access request is an access request to the storage node;

a data storage administration means which administers information in which an ID of data to be written, a physical address as a data storage destination, and access frequency information are associated with each other, and which reads and writes data in accordance with the ID of data designated by the data input/output administration means, and in accordance with a data read/write command; and a storage used amount administration means which classifies addresses of the storage device in such a manner that a capacity of the first storage region and a capacity of the second storage region are filled on the basis of a logical capacity included in the system configuration information to be acquired from the storage administration device according to any one of Supplemental Notes 1 to 6.

(Supplemental Note 14)

A distributed data storage system including the storage administration device according to any one of Supplemental Notes 1 to 6; and the storage node according to Supplemental Note 13.

This application claims the priority based on Japanese Patent Application No. 2013-106077 filed on May 20, 2013, and all of the disclosure of which is hereby incorporated.

REFERENCE SIGNS LIST

1 Client device
2 Network
3 Distributed data storage system
4 Administration node
5 Storage node
6 Storage node
7 Input/output unit
8 Keyboard
9 Mouse
10 Setting unit
11 Monitor
12 Determination unit
13 Transmission unit
14 Storage unit
15 Data input/output administration unit
16 Data storage destination administration unit
17 Storage used amount administration unit
18 Storage unit
19 Storage device
700 Storage node administration device
701 Setting unit
702 Determination unit
703 Transmission unit
801 CPU
802 RAM
803 ROM
804 Storage device
805 External device connection interface
806 Network interface

The invention claimed is:

1. A storage node administration device comprising:

a setting unit configured to set at least one reference storage node from a plurality of storage nodes having different I/O performances included in a distributed data storage system, to partition a storage region of each of the storage nodes other than the reference storage node into a first storage region and a second storage region based on the I/O performance and a logical capacity of the reference storage node, and to set a logical capacity of the first storage region and a logical capacity of the second storage region in accordance with the I/O performance of the storage nodes other than the reference storage node;

a determination unit configured to determine system configuration information reflecting a configuration change of the distributed data storage system based on information set by the setting means; and a transmission unit configured to transmit the system configuration information determined by the determination unit to the storage nodes having different I/O performances, wherein the setting unit is further configured to set the first storage region and the second storage region of each of the storage nodes, other than the reference storage node, based on the I/O performance of the respective storage node by:

setting the logical capacity of the first storage region of each of the storage nodes other than the reference storage node to be N times of the logical capacity of the reference storage node while the I/O performance of each of the storage nodes other than the reference storage node is N times of the I/O performance of the reference storage node, and setting a remaining capacity of each of the storage nodes, other than the reference storage node, that exceeds N times of the logical capacity of the reference storage node as the second storage region, while the logical capacity of the storage nodes other than the reference storage node is N times or more of the logical capacity of the reference storage node.

2. The storage node administration device according to claim 1, wherein
the setting unit is configured to set a capacity of N times of a logical capacity set in the first storage region of the reference storage node as the logical capacity of the first storage region of the storage nodes other than the reference storage node while a first storage region and a second storage region are set in the reference storage node.

3. A storage node logical capacity setting method comprising:
setting at least one reference storage node from storage nodes having different I/O performances included in a distributed data storage system; and
partitioning a storage region of each of the storage nodes other than the reference storage node into a first storage region and a second storage region based on the I/O performance and a logical capacity of the reference storage node and setting a logical capacity of the first storage region and a logical capacity of the second storage region in accordance with the I/O performance of the storage nodes other than the reference storage node,
wherein the first storage region and the second storage region of each of the storage nodes, other than the reference storage node, are set based on the I/O performance of the respective storage node by:
setting a logical capacity of a first storage region of each of the storage nodes other than the reference storage node to be N times of the logical capacity of the reference storage node while the I/O performance of each of the storage nodes other than the reference storage node is N times of the I/O performance of the reference storage node, and
setting a remaining capacity of each of the storage nodes, other than the reference storage node, that exceeds N times of the logical capacity of the reference storage node as the second storage region, while the logical capacity of the storage nodes other than the reference storage node is N times or more of the logical capacity of the reference storage node.

4. A non-transitory recording medium recording a program that causes a computer to execute:
a process of setting at least one reference storage node from a plurality of storage nodes having different I/O performances included in a distributed data storage system and
a process of partitioning a storage region of each of the storage nodes other than the reference storage node into a first storage region and a second storage region, referring to the I/O performance and a logical capacity of the reference storage node, and setting a logical capacity of the first storage region and a logical capacity of the second storage region in accordance with the I/O performance of the storage nodes other than the reference storage node; and
a process of setting the first storage region and the second storage region of each of the storage nodes, other than the reference storage node, based on the I/O performance of the respective storage node by:
setting a logical capacity of a first storage region of each of the storage nodes other than the reference storage node to be N times of the logical capacity of the reference storage node while the I/O performance of each of the storage nodes other than the reference storage node is N times of the I/O performance of the reference storage node; and
setting a remaining capacity of each of the storage nodes, other than the reference storage node, that exceeds N times of the logical capacity of the reference storage node as the second storage region, while the logical capacity of the storage nodes other than the reference storage node is N times or more of the logical capacity of the reference storage node.

5. A storage node comprising:
a storage unit configured to include a storage device which is partitioned into a first storage region and a second storage region by the storage administration device according to claim 1;
a data input/output administration unit configured to determine whether an access request to data to be stored in the storage unit is a request to the storage node;
a data storage administration unit configured to administer information in which an ID of data to be written, a physical address as a data storage destination, and access frequency information are associated with each other, and to read and to write data in accordance with the ID of data designated by the data input/output administration unit and with a data read/write command; and
a storage used amount administration unit configured to classify addresses of the storage device so that a capacity of the first storage region and a capacity of the second storage region are filled based on a logical capacity included in the system configuration information to be acquired from the storage administration device according to claim 1.

6. A distributed data storage system comprising:
the storage administration device according to claim 1; and
a storage node including:
a storage unit configured to include a storage device which is partitioned into a first storage region and a second storage region by the storage administration device according to claim 1;
a data input/output administration unit configured to determine whether an access request to data to be stored in the storage unit is a request to the storage node;
a data storage administration unit configured to administer information in which an ID of data to be written, a physical address as a data storage destination, and access frequency information are associated with each other, and to read and to write data in accordance with the ID of data designated by the data input/output administration unit and with a data read/write command; and
a storage used amount administration unit configured to classify addresses of the storage device so that a capacity of the first storage region and a capacity of the second storage region are filled based on a logical capacity included in the system configuration information to be acquired from the storage administration device according to claim 1.

* * * * *